United States Patent
Mohammed et al.

(10) Patent No.: US 8,113,819 B2
(45) Date of Patent: Feb. 14, 2012

(54) BACK-UP DEVICE FOR USE IN A MELT DISTRIBUTION APPARATUS OF AN INJECTION MOLDING SYSTEM

(75) Inventors: Sohail Mohammed, Manchester, CT (US); Darrin Albert Macleod, Jeffersonville, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 14 days.

(21) Appl. No.: 12/936,530

(22) PCT Filed: May 22, 2009

(86) PCT No.: PCT/US2009/044958
§ 371 (c)(1),
(2), (4) Date: Oct. 6, 2010

(87) PCT Pub. No.: WO2009/158091
PCT Pub. Date: Dec. 30, 2009

(65) Prior Publication Data
US 2011/0027410 A1    Feb. 3, 2011

(51) Int. Cl.
*B29C 45/22* (2006.01)
(52) U.S. Cl. .................. 425/564; 425/566; 425/568
(58) Field of Classification Search .................. 425/562, 425/563, 564, 565, 566, 568
See application file for complete search history.

(56) References Cited

U.S. PATENT DOCUMENTS

| | | | |
|---|---|---|---|
| 4,173,448 A | 11/1979 | Rees et al. | |
| 4,705,473 A | 11/1987 | Schmidt | |
| 4,740,151 A | 4/1988 | Schmidt | |
| 4,755,131 A | 7/1988 | Schmidt | |
| 5,022,846 A | 6/1991 | Schmidt | |
| 5,374,182 A | 12/1994 | Gessner | |
| 5,378,138 A | 1/1995 | Onuma et al. | |
| 5,387,099 A | 2/1995 | Gellert | |
| 5,894,025 A | 4/1999 | Lee et al. | |
| 5,955,121 A | 9/1999 | Gellert et al. | |
| 6,309,208 B1 | 10/2001 | Kazmer et al. | |
| 6,343,925 B1 | 2/2002 | Jenko | |
| 6,379,144 B1 | 4/2002 | Wright | |
| 6,638,050 B2 | 10/2003 | Bazzo et al. | |
| 6,840,758 B2 | 1/2005 | Babin et al. | |
| 7,172,409 B2 | 2/2007 | Tabassi | |
| 7,189,071 B2 * | 3/2007 | Olaru | 425/563 |
| 7,955,071 B1 * | 6/2011 | Adas et al. | 425/564 |
| 2002/0037339 A1 | 3/2002 | Jenko | |
| 2003/0143298 A1 | 7/2003 | Blais | |
| 2004/0156944 A1 * | 8/2004 | Olaru | 425/563 |
| 2004/0185138 A1 | 9/2004 | Tabassi | |

* cited by examiner

Primary Examiner — Timothy Heitbrink (57) ABSTRACT

Disclosed, amongst other things, is a back-up device that is configured to provide a structural support, in use, between a manifold and a housing member within a melt distribution apparatus of an injection molding system. The back-up device is associated, in use, with a valve-gate apparatus within a nozzle drop. The back-up device includes a cold-side member formed from a first material and a hot-side member formed from a second material. The first material is more thermally conductive than the second material. The cold-side member is configured to be thermally connectable, in use, with the housing member and the hot-side member. The hot-side member is configured to be thermally connectable, in use, with the manifold and the cold-side member. The hot-side member is also configured to prevent the cold-side member from directly contacting the manifold.

16 Claims, 4 Drawing Sheets

BACK-UP DEVICE FOR USE IN A MELT DISTRIBUTION APPARATUS OF AN INJECTION MOLDING SYSTEM

TECHNICAL FIELD

The present invention generally relates to, but is not limited to, molding systems, and more specifically the present invention relates to, but is not limited to, a back-up device, and a melt distributing apparatus including the back-up device, amongst other things.

BACKGROUND

It is well known in the art of injection molding to provide a melt distribution apparatus in association with an injection mold for sake of distribution a molding material that is fluidly receivable in the melt distribution apparatus, in use, from an injection unit, for distribution to one or more molding cavities that are defined in the injection mold. There are varied types of melt distribution apparatus in use today. One such type of the melt distribution apparatus is commonly known to those skilled in the art as a hot runner.

The hot runner is characterized in that a network of melt channels defined therein, for the distribution of the molding material, are typically heated such that the molding material that is flowable therethrough, in use, is prevented, for the most part, from solidifying therein. The hot runner typically includes a housing made up of plates and wherein the plates are adapted to define one or more cavities therebetween and/or channels therethrough within and/or through which are arranged various heated melt distribution components such as, for example, a manifold, a nozzle drop and/or a sprue bushing that together cooperate to define the network of melt channels. The nozzle drop of the hot runner defines, in use, at least one melt channel of the network of melt channels and further is fluidly connectable with the molding cavity of the injection mold. As the flow of the molding material through the nozzle drop is typically cyclically started and stopped with each molding cycle, a gating structure is also typically associated with the nozzle drop, the gating structure being configured to selectively block a gate to control an outflow of the molding material from the nozzle drop. The gating structures are typically thermally and/or mechanically operable. One such mechanically-operable gating structure that is used extensively in the industry is the so-called valve-gate apparatus. The valve-gate apparatus uses a valve member that is selectively actuatable, in use, by a valve gate actuator, for selectively blocking of the gate. Also typically associated with the nozzle drop having a valve-gate apparatus is a back-up device that is arranged between the housing and the manifold. The back-up device is configured to couple, in use, an operationally generated force between the manifold and the housing. The back-up device may also be configured to thermally separate, in use, the heated manifold from the relatively cool housing thereby making it easier to maintain the manifold and/or other heated melt distribution component at a desired operating temperature. Further, the back-up device may be configured to define a guiding structure for slidably guiding, in use, a portion of the valve member as the valve member is selectively slidably cycled between a blocked and an open configuration with respect to the gate.

A hot runner including a valve-gate apparatus that includes a back-up device is described in U.S. Pat. No. 6,840,758 to Babin et al., published on Jan. 11, 2005. The patent describes, amongst other things a hot runner that includes a spacer that may be used to thermally insulate a manifold block from an actuator block. The spacer may also be used to help retain a bushing in place in a manifold pass-through and to improve the seal between the bushing sealing surface on bushing and a manifold sealing surface.

With the valve-gate apparatus, in general, it is not uncommon for molding material, such as a thermoplastic (e.g. Polyethylene Terephthalate (PET) and the like), in either a solid particulate or in a molten state, to propagate rearward through whatever clearance that may be present between the valve member and the guiding structure and/or between the valve member and an associated valve bushing. The valve bushing is configured to be arranged in the manifold for slidably guiding, in use, a further portion of the valve member. This undesirable propagation of molding material may eventually impede the slidable movement of the valve member or continue further into the valve-gate apparatus wherein it may effect the operation of other components thereof (e.g. a pneumatic valve gate actuator).

SUMMARY

In accordance with a first aspect of the present invention there is provided a back-up device that is configured to provide a structural support, in use, between a manifold and a housing member within a melt distribution apparatus of an injection molding system. The back-up device is associated, in use, with a valve-gate apparatus within a nozzle drop. The back-up device includes a cold-side member formed from a first material and a hot-side member formed from a second material. The first material is more thermally conductive than the second material. The cold-side member is configured to be thermally connectable, in use, with the housing member and the hot-side member. The hot-side member is configured to be thermally connectable, in use, with the manifold and the cold-side member. The hot-side member is also configured to prevent the cold-side member from directly contacting the manifold. The hot-side member reduces heat transfer between the manifold and the cold-side member.

In accordance with a second aspect of the present invention there is provided a melt distribution apparatus that includes the back-up device in accordance with the first aspect of the present invention.

DETAILED DESCRIPTION OF THE DRAWINGS

A better understanding of the non-limiting embodiments of the present invention (including alternatives and/or variations thereof) may be obtained with reference to the detailed description of the non-limiting embodiments along with the following drawings, in which.

The drawings are not necessarily to scale and are may be illustrated by phantom lines, diagrammatic representations and fragmentary views. In certain instances, details that are not necessary for an understanding of the non-limiting embodiments or that render other details difficult to perceive may have been omitted.

DETAILED DESCRIPTION OF THE EXEMPLARY EMBODIMENTS

To mitigate the undesirable propagation of molding material into the valve gate apparatus the non-limiting embodiments of the valve gate apparatus that follow include a back-up device that includes a hot-side member and a cold-side member. Some of the non-limiting embodiments that follow also include a seal that is configurable in the cold-side member, wherein a relatively cold temperature that is maintainable in the cold-side member provides for an improved operation and longevity of the seal.

Figure 1A:
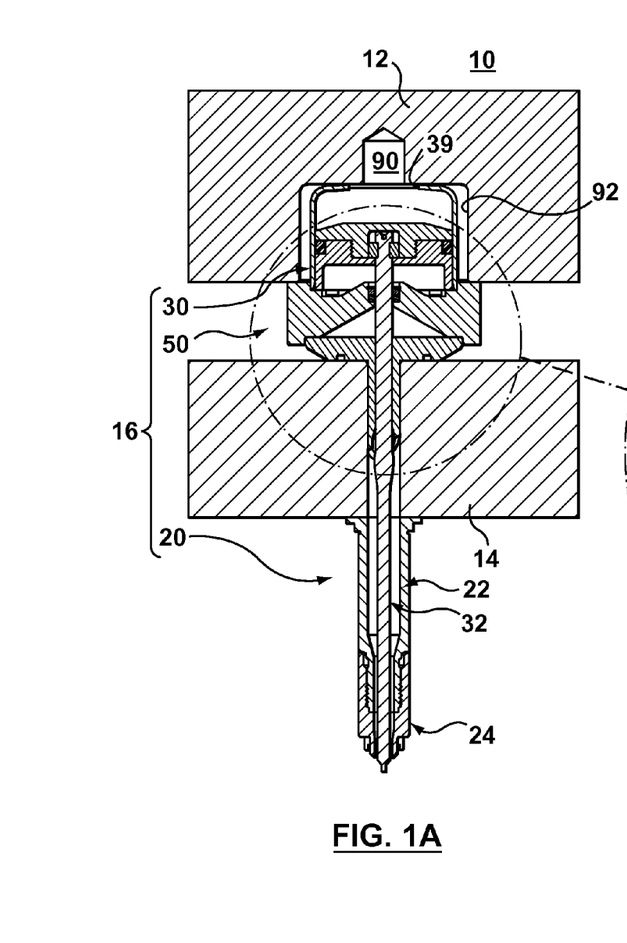
FIG. 1A is a section view through a melt distribution apparatus according to a non-limiting embodiment of the present invention.

With reference to FIG. 1A, a non-limiting embodiment of a melt distribution apparatus 10 is shown. The melt distribution apparatus 10 has been configured for operation as a hot runner for use in an injection molding system (not shown). The melt distribution apparatus 10 has been configured generally in accordance with the description of the hot runner that is provided within the background provided hereinbefore, the difference being the subject of the detailed description that follows. Consistent with the background discussion provided hereinbefore, the hot runner is configured to define a network of melt channels for controllably fluidly coupling, in use, a source of molding material with a molding cavity (not shown) that is definable in an injection mold (not shown).

The melt distribution apparatus 10 includes, amongst other things, a housing member 12 (commonly known as an air plate, or manifold backing plate) for housing, in use, melt distribution components such as a manifold 14 and a nozzle drop 16. The melt distribution apparatus 10 may be associated with other components (not shown) the description and depiction of which is unnecessary given their ubiquitous use and understanding amongst those skilled in the art. These 'other components' may include, for example, a further housing member (e.g. manifold plate), heaters, auxiliary fluid distribution structures (e.g. air and water manifolds and the like), power and control structures, to name but a few, as well as other melt distribution components such as a sprue bushing and the like. Likewise, while only one nozzle drop 16 is shown in association with the melt distribution apparatus further non-limiting embodiments, not shown, may include any number and arrangement thereof.

As is typical of a hot runner, the housing member 12 and manifold 14 are configured to be cooled and heated, respectively, in use, wherein an operating temperature of the housing member 12 is much lower than a respective operating temperature of the manifold 14. That is, the temperature of the housing member 12 may be maintained, in use, for example, near an ambient temperature whereas the temperature of the manifold 14 may be kept around the melting temperature of the molding material that is to be flowable therethrough.

The nozzle drop 16, as shown, includes a nozzle assembly 20, a valve-gate apparatus 30, and a back-up device 50.

The nozzle assembly 20 is of a typical construction in the art and hence will not be described in detail herein. Nonetheless, the nozzle assembly 20 is shown to include a housing 22 with a tip member 24 threadably retained to an end thereof. As shown, the other end of the nozzle assembly 20 has been configured to sealingly abut, in use, a forward face of the manifold 14. A melt channel is defined through the nozzle assembly 20 and tip member 24 for supporting, in use, the fluid communication of the molding material between a melt channel that is defined in the manifold (i.e. a lower portion of the bore 17 shown in FIG. 1B), and the molding cavity (not shown) in the injection mold (not shown).

Figure 1B:
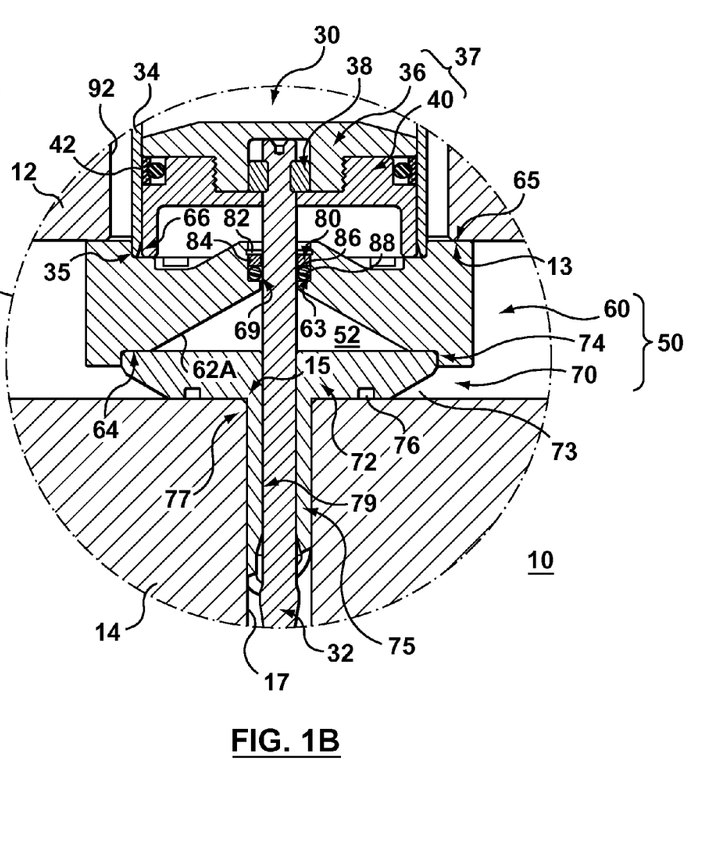
FIG. 1B is an enlarged section view of a circled portion of the melt distribution apparatus of FIG. 1A that more clearly depicts a back-up device in accordance with a non-limiting embodiment of the present invention.

With reference to FIG. 1B, the valve-gate apparatus 30 is shown to include a valve member 32 that is actuatable by an actuator. The actuator is operable to selectively position the valve member 32, in use, for selectively blocking a gate (not shown) that is defined at an entrance to the molding cavity (not shown) in the injection mold (not shown). The actuator shown is a pneumatic device although other types and configurations of actuators are possible, including, for example, mechanical, electro-mechanical, or mechanical actuators. The actuator, as shown, includes an air cylinder 34 and a piston 37 slidably arranged therein. The piston 37 is of a two-piece construction made up of a top piston 36 and a bottom piston 40. A head of the valve member 32 is lockable, as shown, between the top piston 36 and the bottom piston 40 with the assistance of a locking ring 38. An annular recess is also defined through outer surfaces of the top piston 36 and the bottom piston 40 for receiving an air seal 42 that is configured to slidably cooperate, in use, with an inner surface of the air cylinder 34 in the known manner. The air cylinder 34 is arranged, as shown, within a pocket 92 (FIG. 1A) that is defined in the housing member 12. An air channel 90 (FIG. 1A), also defined in the housing member 12, is configured to cooperate with a port 39 that is defined through an upper portion of the air cylinder 34 for a selective pressurizing, in use, of an interior space of the air cylinder 34 that is above the piston 37 and thereby move the piston 37 and with it the valve member 32 towards the blocked configuration with respect to the gate (not shown). A lower portion of the air cylinder 34 is configured to sealingly cooperate with an upper portion of a cold-side member 60 of the back-up device 50, a detailed description of which follows, for defining an enclosed space beneath the piston 37. A further air channel (not shown) is also defined in the housing member 12 for fluid communication with the enclosed space, via a further port (not shown) that is defined through a lower portion of the air cylinder 34 in a position that remains unobstructed by a lower protrusion of the piston 37, for a selective pressurizing, in use, of the enclosed space and thereby move the piston 37 and with it the valve member 32 towards an open configuration with respect to the gate (not shown).

The back-up device 50 is configured to provide a structural support, in use, between the manifold 14 and the housing member 12. The back-up device 50 includes a cold-side member 60 formed from a first material and a hot-side member 70 formed from a second material, wherein the first material is more thermally conductive than the second material. The cold-side member 60 is configured to be thermally connectable, in use, with the housing member 12 and the hot-side member 70. Likewise, the hot-side member 70 is configured to be thermally connectable, in use, with the manifold 14 and the cold-side member 60. In addition, the hot-side member 70 is configured to prevent the cold-side member 60 from directly contacting the manifold 14. The relatively low thermal conductivity of the hot-side member 70 functions, in use, to thermally isolate the cold-side member 60 from the heated manifold 14 thereby working to prevent the heating of the cold-side member 60. The relatively high thermal conductivity of the cold-side member 60 functions, in use, to accentuate heat transfer between the cold-side member 60 and the housing member 12 thereby working to keep the cold-side member 60 cool. The lack of a direct heat conduction interface between the cold-side member 60 and the heated manifold 14 further prevents, in use, unwanted heating of the cold-side member 60. Accordingly, the back-up device 50, as configured within the melt distribution apparatus 10, reduces heat transfer from the heated manifold 14 into the actuator of the valve-gate apparatus 30.

To ease the task of assembling the melt distribution apparatus 10 the cold-side member 60 and the hot-side member 70 of the back-up device 50 are integrally bonded together at a junction between the cold-side member interface 74 and the hot-side member interface 64. Alternatively, the cold-side member 60 and the hot-side member 70 may be releasably joined together (not shown), or just simply stacked one on top of the other (i.e. they remain separable).

The non-limiting embodiment of the hot-side member 70 that is shown in FIG. 1B is made up of two integral portions that include a bearing structure 72 and a valve bushing 75—although these portions need not be integral as will be shown with the alternative non-limiting embodiments that follow. The bearing structure 72 defines a manifold interface 77, in part, and a cold-side member interface 74. The manifold interface 77 is configured to cooperate, in use, with a hot-side support interface 15 that is defined on the manifold 14 to accommodate an operationally generated force therebetween (e.g. compression from thermal growth of the melt distribution components of the melt distribution apparatus 10, reaction forces within the nozzle drop 16 from an injection of the molding material therethrough, as well as other forces that are typically associated with nozzle drop 16 as would be known to the skilled person). Likewise, the cold-side member interface 74 is configured to cooperate, in use, with a hot-side member interface 64 that is defined on the cold-side member 60 to accommodate the operationally generated force acting further thereacross.

The manifold interface 77 is further defined by the valve bushing 75 to cooperate, in use, with the hot-side support interface 15 to substantially axially locate the hot-side member 70. The foregoing is provided by configuring the valve bushing 75 to be receivable within the bore 17 that is defined in the manifold 14 thereby providing location of the back-up device 50. In addition, a hot-side valve passageway 79 is defined through the valve bushing 75, the hot-side valve passageway 79 being configured to slidably fit-around a first portion of a valve member 32 for a guiding thereof as the valve member 32 is slidably operated in use.

Likewise, the hot-side member 70 and the cold-side member 60 are also kept in alignment with the assistance of a complementary configuration of the cold-side member interface 74 and the hot-side member interface 64, respectively. As shown, the foregoing is provided, in part, by defining the hot-side member interface 64 as a recessed cylindrical seat and by defining the cold-side member interface 74 to have a complementary close-fitting configuration thereto.

The manifold interface 77 also includes an interruption that is provided by an annular groove that is formed in the hot-side member 70. The annular groove defines a seat 76 for receiving, in use, a seal ring (not shown) to further limit, in use, melt leakage and heat transfer between the manifold 14 and the hot-side member 70.

To complete the structural support, the cold-side member 60 is further configured to define a housing interface 65. The housing interface 65 being configured to cooperate, in use, with a cold-side support interface 13 that is defined on the housing member 12 to accommodate the operationally generated force acting thereacross.

The cold-side member 60 further defines a cold-side valve passageway 69 that is configured to slidably fit-around an outer surface of a second portion of a valve member 32. The cold-side member 60 further defines a seat 63 that is configured to receive, in use, a seal 80. The seal 80 is configured to slidably seal, in use, in cooperation with the outer surface of the second portion of the valve member 32 for preventing undesirable propagation of molding material into the actuator. The non-limiting embodiment of the seal 80 includes a sealing member 88 that is retained within the seat 63 by a spacer 84 and a retaining ring 82. A technical effect of locating the seal 80 within the cold-side member 60 is the ability to maintain, in use, the seal 80 at a low temperature relative that of the hot-side member 70 and the manifold 14 wherein one or both of the seal integrity and its operational longevity may be enhanced.

As previously introduced, a lower portion of the air cylinder 34 is configured to sealingly cooperate, in use, with the upper portion of the cold-side member 60. In more detail, a recessed cylindrical seat is defined through the upper portion of the cold-side member 60 thereby providing an actuator interface 66 for sealingly cooperating, in use, with an auxiliary interface 35 that is defined on the lower portion of the air cylinder 34 by virtue of having a close complementary configuration.

The cold-side member 60 and the hot-side member 70 are further configured to define a space therebetween that provides for further thermal separation thereof. The space further provides a weepage gallery 52 within which any undesirable propagation of molding material that may have passed, in use, between the valve member 32 and the hot-side valve passageway 79 may be collected, wherein, a sliding of the valve member 32 through at least one of the seal 80 or the cold-side valve passageway 69 may provide for a wiping of the molding material from the outer portion of the valve member 32 thereto.

Figure 2:
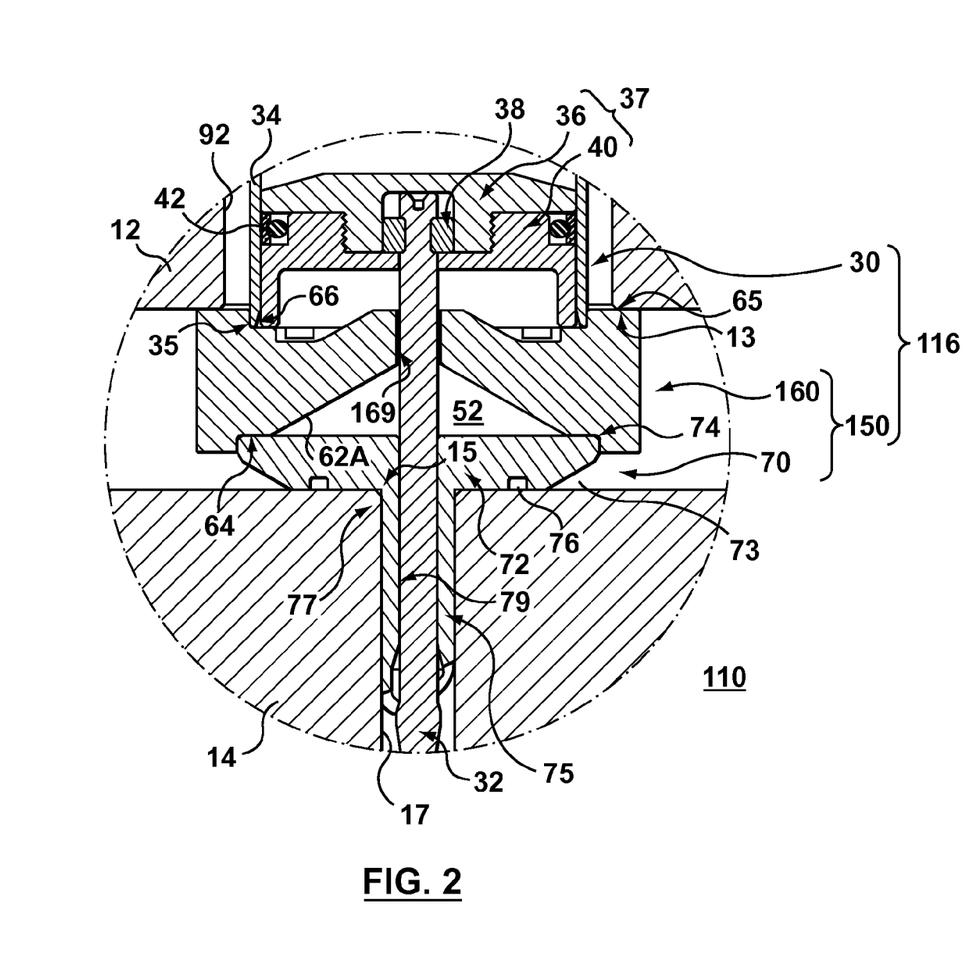
FIG. 2 is a section view of a portion of a melt distribution apparatus in accordance with an alternative non-limiting embodiment of the present invention, and more particularly of a back-up device in accordance with another non-limiting embodiment of the present invention.

With reference to FIG. 2, an alternative non-limiting embodiment of a melt distribution apparatus 110 is shown. The melt distribution apparatus 110 is configured identically to the melt distribution apparatus 10, previously described and shown in FIG. 1A, with the exception of including an alternative non-limiting embodiment of a cold-side member 160 in place of the cold-side member 60. Accordingly, the melt distribution apparatus 110 includes, amongst other things, the housing member 12 for housing, in use, melt distribution components such as the manifold 14 and a nozzle drop 116. The nozzle drop 116 includes the valve-gate apparatus 30 and the nozzle assembly 20 (not shown), both as previously described, and a back-up device 150. The back-up device 150 includes the hot-side member 70, as previously described, and the alternative non-limiting embodiment of the cold-side member 160.

The cold-side member 160 is configured identically to the cold-side member 60, previously described and shown in FIG. 1B, with the exception of omitting the seal 80. That is, the cold-side member 160 defines a cold-side valve passageway 169 that is configured to slidably fit-around the outer surface of a second portion of a valve member 32 much like the cold-side valve passageway 69 of the cold-side member 60 as previously described.

Figure 3:
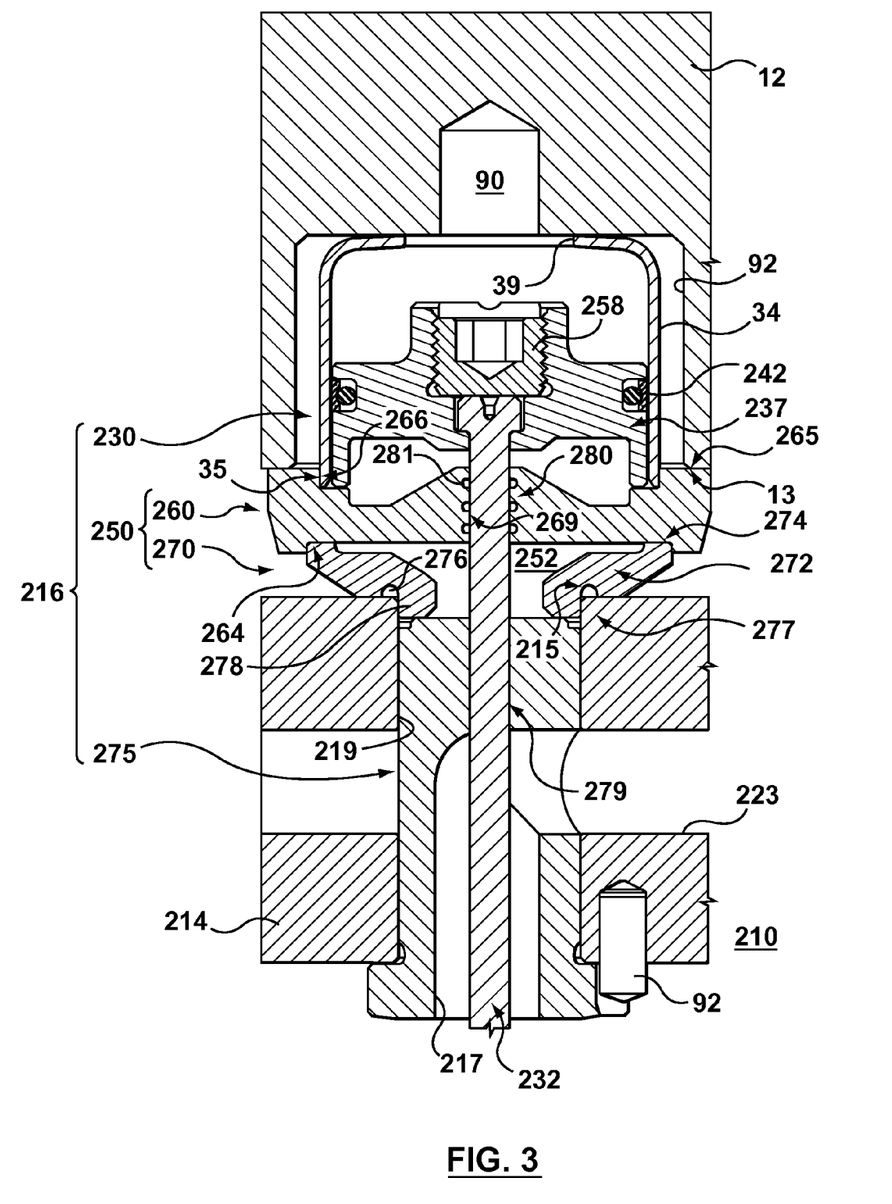
FIG. 3 is a section view of a portion a melt distribution apparatus in accordance with another alternative non-limiting embodiment of the present invention, and more particularly of a back-up device in accordance with another alternative non-limiting embodiment of the present invention.

With reference to FIG. 3, another alternative non-limiting embodiment of the melt distribution apparatus 210 is shown. The melt distribution apparatus 210, including the melt distribution components thereof, are configured similarly to those of the melt distribution apparatus 10, previously described and shown in FIG. 1A. The melt distribution apparatus 210 includes, amongst other things, the housing member 12, as previously described, for housing, in use, melt distribution components such as a manifold 214 and a nozzle drop 216.

The nozzle drop 216, as shown, includes a valve-gate apparatus 230, a back-up device 250, a valve bushing 275, and a nozzle assembly (not shown).

The nozzle assembly (not shown) is of a similar construction to the nozzle assembly 20 of FIG. 1A except that the nozzle housing thereof would be configured to sealingly abut, in use, a forward face of the valve bushing 275.

The valve-gate apparatus 230 is shown to include a valve member 232 that is actuatable by an actuator. The actuator is operable to selectively position the valve member 232, in use, for selectively blocking the gate (not shown) that is defined at the entrance to the molding cavity (not shown) in the injection mold (not shown). The actuator shown, like with the valve-gate apparatus 30, is a pneumatic device although other types and configurations of actuators are possible. The actuator, as shown, includes the air cylinder 34, as previously described, and a piston 237 slidably arranged therein. A head of the valve member 232 is lockable, as shown, within a recess formed in the piston 237 with the assistance of a fastener 258. An annular recess is also defined through an outer surface of the piston 237 for receiving an air seal 242 that is configured to slidably cooperate, in use, with the inner surface of the air cylinder 34 in the known manner. The air cylinder 34 is arrangeable, as shown, within the pocket 92 that is defined in the housing member 12. The air channel 90 is configured to cooperate with the port 39 that is defined through an upper portion of the air cylinder 34 for a selective pressurizing, in use, of an interior space of the air cylinder 34 that is above the piston 237 and thereby move the piston 237 and with it the valve member 232 towards the blocked configuration with respect to the gate (not shown). A lower portion of the air cylinder 34 is configured to sealingly cooperate with an upper portion of a cold member 260 of the back-up device 250, a detailed description of which follows, for defining an enclosed space beneath the piston 237. A further air channel (not shown) is also defined in the housing member 12 for fluid communication with the enclosed space, via a further port (not shown) that is defined through a lower portion of the air cylinder 34, for a selective pressurizing, in use, of the enclosed space and thereby move the piston 237 and with it the valve member 232 towards an open configuration with respect to the gate (not shown).

The back-up device 250 is configured to provide a structural support, in use, between the manifold 214 and the housing member 12 in the same manner as the back-up device 50 in melt distribution apparatus 10. The back-up device 250 includes a cold-side member 260 formed from a first material and a hot-side member 270 formed from a second material, wherein the first material is more thermally conductive than the second material. The cold-side member 260 is configured to be thermally connectable, in use, with the housing member 12 and the hot-side member 270. Likewise, the hot-side member 270 is configured to be thermally connectable, in use, with the manifold 214 and the cold-side member 260. In addition, the hot-side member 270 is configured to prevent the cold-side member 260 from directly contacting the manifold 214.

The alternative non-limiting embodiment of the hot-side member 270 includes a bearing structure 272 which unlike the hot-side member 70 (FIG. 1B) does not include an integral valve bushing. The bearing structure 272 defines a manifold interface 277 and a cold-side member interface 274. The manifold interface 277 is configured to cooperate, in use, with a hot-side support interface 215 that is defined on the manifold 214 to accommodate an operationally generated force therebetween. Likewise, the cold-side member interface 274 is configured to cooperate, in use, with a hot-side member interface 264 that is defined on the cold-side member 260 to accommodate the operationally generated force acting further thereacross.

The manifold interface 277 is further configured to include a cylindrical spigot 278 that is configured to cooperate, in use, with an upper portion of a bore 219 that is defined in the manifold 214 thereby locating the hot-side member 270. Likewise, the hot-side member 270 and the cold-side member 260 are also kept in alignment with the assistance of a complementary configuration of the cold-side member interface 274 and the hot-side member interface 264, respectively. As shown, the foregoing is provided, in part, by defining the hot-side member interface 264 as a recessed cylindrical seat and by defining the cold-side member interface 274 to have a complementary close-fitting configuration thereto.

The manifold interface 277 also includes an interruption that is provided by an annular groove that is formed in the hot-side member 270. The annular groove defines a seat 276 for receiving, in use, a seal ring (not shown) to further limit, in use, melt leakage and heat transfer between the manifold 214 and the hot-side member 270.

The valve bushing 275 is configured to be received within a further portion of the bore 219 that is defined in the manifold 214. The valve bushing 275 is configured to define a melt channel 217 for connecting, in use, a melt channel 223 that is defined in the manifold 214 with a melt channel of the nozzle assembly (not shown). The valve bushing 275 is also configured to define a hot-side valve passageway 279 therethrough, the hot-side valve passageway 279 being configured to slidably fit-around a first portion of a valve member 232 for a guiding thereof as the valve member 232 is slidably operated in use. Also shown is a dowel 93 for ensuring alignment of the melt channel 223 with the bore 217 of the manifold 214 and the valve bushing 275, respectively.

To complete the structural support, the cold-side member 260 is further configured to define a housing interface 265. The housing interface 265 being configured to cooperate, in use, with the cold-side support interface 13 on the housing member 12 to accommodate the operationally generated force acting thereacross.

The cold-side member 260 further defines a cold-side valve passageway 269 that is configured to slidably fit-around an outer surface of a second portion of a valve member 232. A set of trap grooves are defined through a surface of the cold-side valve passageway 269. Each trap groove 281 of the set of trap grooves are configured to trap, in use, a stray amount of a molding material therein for forming a seal 280 that is composed of the molding material in a solidified form, and wherein the seal 280 is configured to slidably seal, in use, in cooperation with the second portion of the valve member 232. A technical effect of locating the trap groove 281 in the cold-side member 260 is the ability to maintain, in use, the seal 280 at a temperature that is cool enough to keep the molding material therein in solidified state.

As previously introduced, a lower portion of the air cylinder 34 is configured to sealingly cooperate, in use, with the upper portion of the cold-side member 260. In more detail, a recessed cylindrical seat is defined through the upper portion of the cold-side member 260 thereby providing an actuator interface 266 for sealingly cooperating, in use, with an auxiliary interface 35 that is defined on the lower portion of the air cylinder 34 by virtue of having a close complementary configuration.

The cold-side member 260 and the hot-side member 270 are further configured to define a space therebetween that provides for further thermal separation thereof. The space further provides a weepage gallery 252 within which any undesirable propagation of molding material that may have passed, in use, between the valve member 232 and the hot-side valve passageway 279 of the valve bushing may be collected, wherein, a sliding of the valve member 232 through at least one of the seal 280 or the cold-side valve passageway 269 may provide for a wiping of the molding material from the outer portion of the valve member 232 thereto.

Figure 4:
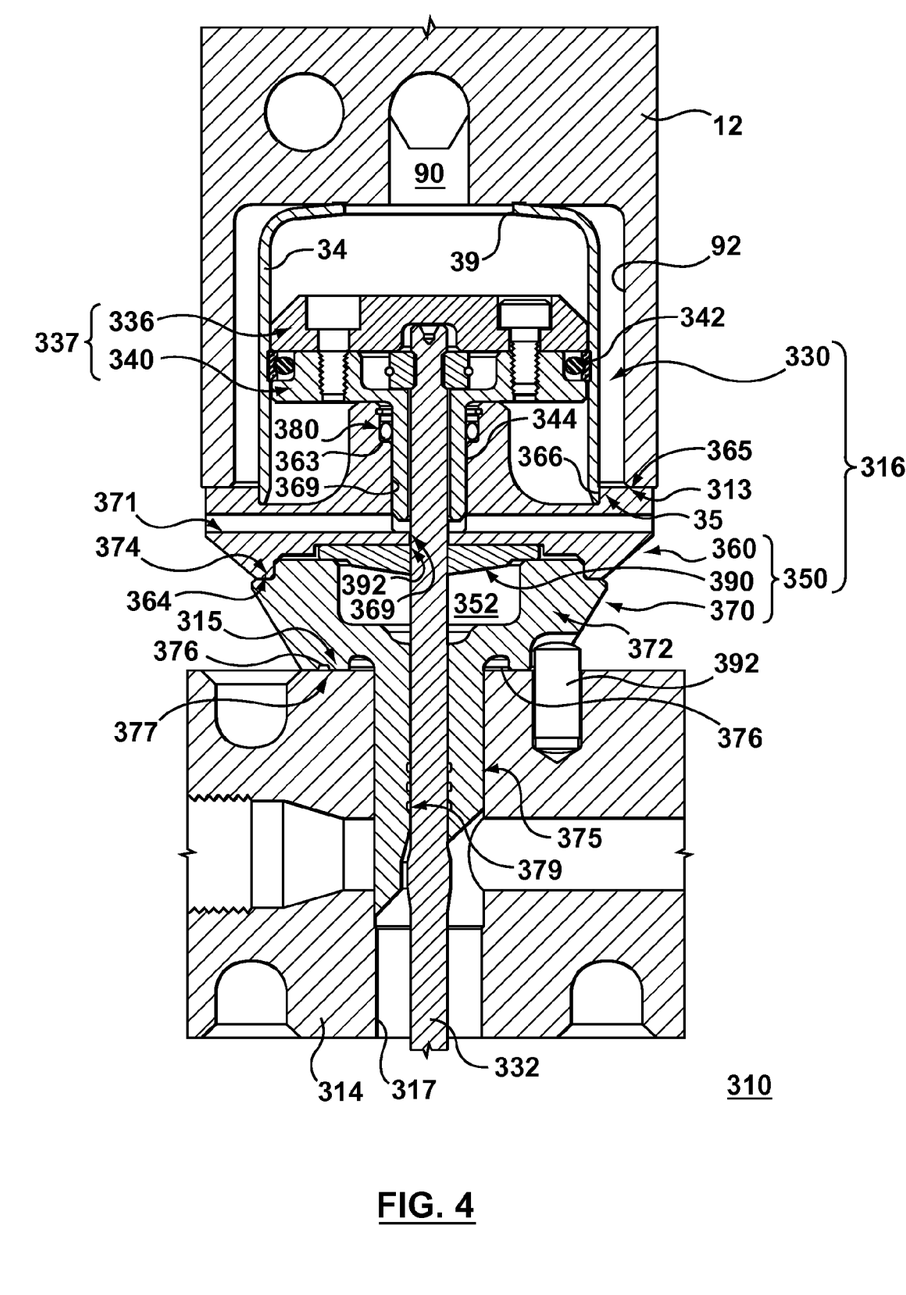
FIG. 4 is a section view of a portion a melt distribution apparatus in accordance with a yet another alternative non-limiting embodiment of the present invention, and more particularly of a back-up device in accordance with yet another alternative non-limiting embodiment of the present invention.

With reference to FIG. 4, yet another alternative non-limiting embodiment of the melt distribution apparatus 310 is shown. The melt distribution apparatus 310, including the melt distribution components thereof, are configured similarly to those of the melt distribution apparatus 10, previously described and shown in FIG. 1A. The melt distribution apparatus 310 includes, amongst other things, the housing member 12, as previously described, for housing, in use, melt distribution components such as a manifold 314 and a nozzle drop 316.

The nozzle drop 316, as shown, includes a valve-gate apparatus 330, a back-up device 350, and a nozzle assembly (not shown).

The nozzle assembly (not shown) is of a similar construction to the nozzle assembly 20 of FIG. 1A.

The valve-gate apparatus 330 is shown to include a valve member 332 that is actuatable by an actuator. The actuator is operable to selectively position the valve member 332, in use, for selectively blocking the gate (not shown) that is defined at the entrance to the molding cavity (not shown) in the injection mold (not shown). The actuator shown, like with the valve-gate apparatus 30, is a pneumatic device although other types and configurations of actuators are possible. The actuator, as shown, includes an air cylinder 34 and a piston 337 slidably arranged therein. The piston is of a two-piece construction made up of a top piston 336 and a bottom piston 340. A head of the valve member 332 is lockable, as shown, between the top piston 336 and the bottom piston 340 with the assistance of a locking ring. An annular recess is also defined through outer surfaces of the top piston 336 and the bottom piston 340 for receiving an air seal 342 that is configured to slidably cooperate, in use, with an inner surface of the air cylinder 34 in the known manner. The air cylinder 34 is arrangeable, as shown, within the pocket 92 that is defined in the housing member 12. The air channel 90 is configured to cooperate with the port 39 of the air cylinder 34 for a selective pressurizing, in use, of an interior space of the air cylinder 34 that is above the piston 337 and thereby move the piston 337 and with it the valve member 332 towards the blocked configuration with respect to the gate (not shown). A lower portion of the air cylinder 34 is configured to sealingly cooperate with an upper portion of a cold member 360 of the back-up device 350, a detailed description of which follows, for defining an enclosed space beneath the piston 337. A further air channel (not shown) is also defined in the housing member 12 for fluid communication with the enclosed space, via a further port (not shown) that is defined through a lower portion of the air cylinder 34, for a selective pressurizing, in use, of the enclosed space and thereby move the piston 337 and with it the valve member 332 towards an open configuration with respect to the gate (not shown).

The back-up device 350 is configured to provide a structural support, in use, between the manifold 314 and the housing member 12 in the same manner as the back-up device 50 in melt distribution apparatus 10. The back-up device 350 includes a cold-side member 360 formed from a first material and a hot-side member 370 formed from a second material, wherein the first material is more thermally conductive than the second material. The cold-side member 360 is configured to be thermally connectable, in use, with the housing member 12 and the hot-side member 370. Likewise, the hot-side member 370 is configured to be thermally connectable, in use, with the manifold 314 and the cold-side member 360. In addition, the hot-side member 370 is configured to prevent the cold-side member 360 from directly contacting the manifold 314.

The hot-side member 370 is made up of two integral portions that include a bearing structure 372 and a valve bushing. The bearing structure 372 defines a manifold interface 377, in part, and a cold-side member interface 374. The manifold interface 377 is configured to cooperate, in use, with a hot-side support interface 315 that is defined on the manifold 314 to accommodate an operationally generated force. Likewise, the cold-side member interface 374 is configured to cooperate, in use, with a hot-side member interface 364 that is defined on the cold-side member 360 to accommodate the operationally generated force acting further thereacross.

The manifold interface 377 is further defined on the valve bushing 375 to cooperate, in use, with the hot-side support interface 315 to substantially axially locate the hot-side member 370. The foregoing is provided by configuring the valve bushing 375 to be receivable within the bore 317 that is defined in the manifold 314 thereby providing location of the back-up device 350. In addition, a hot-side valve passageway 379 is defined through the valve bushing 375, the hot-side valve passageway 379 being configured to slidably fit-around a first portion of a valve member 332 for a guiding thereof as the valve member 332 is slidably operated in use.

Likewise, the hot-side member 370 and the cold-side member 360 are also kept in alignment with the assistance of a complementary configuration of the cold-side member interface 374 and the hot-side member interface 364, respectively. As shown, the foregoing is provided, in part, by defining the hot-side member interface 364 as a recessed cylindrical seat and by defining the cold-side member interface 374 to have a complementary close-fitting configuration thereto.

The manifold interface 377 also includes an interruption that is provided by an annular groove that is formed in the hot-side member 370. The annular groove defines a seat 376 for receiving, in use, a seal ring (not shown) to further limit, in use, melt leakage and heat transfer between the manifold 14 and the hot-side member 70. heat transfer between the manifold 314 and the hot-side member 370.

To complete the structural support, the cold-side member 360 is further configured to define a housing interface 365. The housing interface 365 being configured to cooperate, in use, with the cold-side support interface 13 on the housing member 12 to accommodate the operationally generated force acting thereacross.

The cold-side member 360 further defines a cold-side valve passageway 369 that is configured to slidably fit-around an outer surface of a second portion of a valve member 332. The cold-side member 360 also defines a seat 363 that is configured to receive, in use, a seal 380. The seal 380 is configured to slidably seal, in use, in cooperation with a sleeve 344 that extends from a base of the piston 337.

As previously introduced, a lower portion of the air cylinder 34 is configured to sealingly cooperate, in use, with the upper portion of the cold-side member 360. In more detail, a recessed cylindrical seat is defined through the upper portion of the cold-side member 360 thereby providing an actuator interface 366 for sealingly cooperating, in use, with an auxiliary interface 35 that is defined on the lower portion of the air cylinder 34 by virtue of having a close complementary configuration.

The back-up device 350 also includes a wiper member 390 that is configured to be flexibly mountable between the cold-side member 360 and the hot-side member 370. The wiper member 390 includes a wiping bore 392 defined therethrough, the wiping bore 392 being configured to slidably fit-around the valve member 332, wherein, a sliding, in use, of the valve member 332 through the wiping bore 392 provides for a wiping of a molding material from an outer portion of the valve member 332 into a weepage gallery 352 that is definable between the wiper member 390 and the hot-side member 370. Further, a weepage discharge channel 371 is defined in the cold-side member 360 from the weepage gallery 352 through to an outer surface thereof for discharging, in use, of molding material that may have leaked therein.

The description of the exemplary embodiments provides examples of the present invention, and these examples do not limit the scope of the present invention. It is understood that the scope of the present invention is limited by the claims. The concepts described above may be adapted for specific conditions and/or functions, and may be further extended to a variety of other applications that are within the scope of the present invention. Having thus described the exemplary embodiments, it will be apparent that modifications and enhancements are possible without departing from the concepts as described.

Therefore, what is to be protected by way of letters patent are limited only by the scope of the following claims:

1. A back-up device (50, 150, 250, 350) that is configured to provide a structural support, in use, between a manifold (14, 214, 314) and a housing member (12) within a melt distribution apparatus (10, 110, 210, 310) of an injection molding system, the back-up device (50, 150, 250, 350) being associated, in use, with a valve-gate apparatus (30, 130, 230, 330) within a nozzle drop (16, 116, 216, 316), the back-up device (50, 150, 250, 350) comprising:
   a cold-side member (60, 160, 260, 360) formed from a first material;
   a hot-side member (70, 270, 370) formed from a second material;
   the first material being more thermally conductive than the second material;
   the cold-side member (60, 160, 260, 360) being configured to be thermally connectable, in use, with the housing member (12) and the hot-side member (12);
   the hot-side member (70, 270, 370) being configured to be thermally connectable, in use, with the manifold (14, 214, 314) and the cold-side member (60, 160, 260, 360); and
   the hot-side member (70, 270, 370) being configured to prevent the cold-side member (60, 160, 260, 360) from directly contacting the manifold (14, 214, 314);
   wherein the hot-side member (70, 270, 370) reduces heat transfer between the manifold (14, 214, 314) and the cold-side member (60, 160, 260, 360).

2. The back-up device (50, 150, 250, 350) of claim 1, wherein:
   the hot-side member (70, 270, 370) includes a bearing structure (72, 272, 372) on which is defined a manifold interface (77, 277, 377) and a cold-side member interface (74, 274, 374);
   the manifold interface (77, 277, 377) being configured to cooperate, in use, with a hot-side support interface (15, 215, 315) that is defined on the manifold (14, 214, 314) to accommodate an operationally generated force therebetween;
   the cold-side member interface (74, 274, 374) being configured to cooperate, in use, with a hot-side member interface (64, 164, 264, 364) that is defined on the cold-side member (60, 160, 260, 360) to accommodate the operationally generated.

3. The back-up device (50, 150, 250, 350) of claim 2, wherein:
   the manifold interface (77, 277, 377) being further configured to cooperate, in use, with the hot-side support interface (15, 215, 315) to substantially axially locate the hot-side member (70, 270, 370).

4. The back-up device (50, 150, 250, 350) of claim 2, wherein:
   the cold-side member interface (74, 274, 374) being further configured to cooperate, in use, with the hot-side member interface (64, 164, 264, 364) to substantially axially align the hot-side member (70, 270, 370) with the cold-side member (60, 160, 260, 360).

5. The back-up device (50, 150, 250, 350) of claim 2, further comprising:
   a valve bushing (75, 275, 375) that is configured to be receivable, at least in part, in use, within a bore (17, 217, 317) that is defined in the manifold (14, 214, 314);
   the valve bushing (75, 275, 375) being further configured to define a hot-side valve passageway (79, 279, 379) that is configured to slidably fit-around a first portion of a valve member (32, 232, 332).

6. The back-up device (50, 150, 350) of claim 5, wherein:
   the valve bushing (75, 275, 375) is integral with the bearing structure (72, 372) of the hot-side member (70, 270, 370).

7. The back-up device (50, 150, 250, 350) of claim 2, wherein:
   the manifold interface (77, 277, 377) includes a seat (76, 276, 376), the seat (76, 276, 376) being configured to receive, in use, a seal ring.

8. The back-up device (50, 150, 250, 350) of claim 2, wherein:
   the cold-side member (60, 160, 260, 360) is further configured to define a housing interface (65, 165, 265, 365);
   the housing interface (65, 165, 265, 365) being configured to cooperate, in use, with a cold-side support interface (13) that is defined on the housing member (12) to accommodate the operationally generated;
   the hot-side member interface (64, 164, 264, 364) being configured to cooperate, in use, with the cold-side member interface (74, 274, 374) that is defined on the hot-side member (70, 270, 370) to accommodate the operationally generated.

9. The back-up device (50, 150, 250, 350) of claim 8, wherein:
   the cold-side member (60, 160, 260, 360) further defines a cold-side valve passageway (69, 169, 269, 369) that is configured to slidably fit-around a second portion of a valve member (32, 232, 332) of the valve-gate apparatus (30, 130, 230, 330);
   the cold-side member (60, 160, 260, 360) further defines a seat (63, 263, 363) that is configured to receive, in use, a seal (80, 380), and wherein the seal (80, 380) is configured to slidably seal, in use, in cooperation with at least one of the second portion of the valve member (32, 232, 332) or a sleeve (344) that is associated with the piston (37, 237, 337).

10. The back-up device (50, 150, 250, 350) of claim 8, wherein:
the cold-side member (60, 160, 260, 360) defines a trap groove (281), the trap groove (281) being configured to trap, in use, a stray amount of a molding material therein for forming a seal (280) that is composed of the molding material in a solidified form, and wherein the seal (280) is configured to slidably seal, in use, in cooperation with a second portion of a valve member (32, 232, 332).

11. The back-up device (50, 150, 250, 350) of claim 8, wherein:
the cold-side member (60, 160, 260, 360) defines an actuator interface (66, 166, 266, 366) that is configured to cooperate, in use, with an auxiliary interface (35) that is associated with the valve-gate apparatus (30, 130, 230, 330).

12. The back-up device (50, 150, 250, 350) of claim 9, wherein:
a weepage gallery (52, 252, 352) is definable between the cold-side member (60, 160, 260) and the hot-side member (70, 170, 270), wherein, a sliding, in use, of the valve member (32, 232, 332) through at least one of the seal (80, 380) or the cold-side valve passageway (69, 169, 269, 369) provides for a wiping of a molding material from an outer portion of the valve member (32, 232, 332) thereto.

13. The back-up device (50, 150, 250, 350) of claim 12, wherein:
a weepage discharge channel (371) is defined in the cold-side member (360) from the weepage gallery (352) through to an outer surface thereof.

14. The back-up device (350) of claim 9, further comprising:
a wiper member (390) that is configured to be flexibly mountable, in use, between the cold-side member (360) and the hot-side member (370), the wiper member (390) including a wiping bore (392) defined therethrough, the wiping bore (392) being configured to slidably fit-around the valve member (332), wherein, a sliding, in use, of the valve member (332) through the wiping bore (392) provides for a wiping of a molding material from an outer portion of the valve member (332) into a weepage gallery (352) that is definable between the wiper member (390) and the hot-side member (370).

15. The back-up device (50, 150, 250, 350) of claim 2, wherein:
the cold-side member (60, 160, 260, 360) and the hot-side member (70, 270, 370) are integrally bonded at a junction between the cold-side member interface (74, 274, 374) and the hot-side member interface (64, 164, 264, 364).

16. A melt distribution apparatus (10, 110, 210, 310) including the back-up device (50, 150, 250, 350) of any one of claims 1 to 15.

* * * * *